(12) United States Patent
Langlois et al.

(10) Patent No.: US 8,736,099 B2
(45) Date of Patent: May 27, 2014

(54) DEVICE AND METHOD FOR COUPLING TWO PARTS OF A DC NETWORK, PARTICULARLY IN AN AIRCRAFT

(75) Inventors: Olivier Langlois, Paris (FR); Lucien Prisse, Toulouse (FR); Marc Aiximeno, Leguevin (FR)

(73) Assignee: Airbus Operations S.A.S., Toulouse (FR)

( * ) Notice: Subject to any disclaimer, the term of this patent is extended or adjusted under 35 U.S.C. 154(b) by 691 days.

(21) Appl. No.: 12/993,659

(22) PCT Filed: May 28, 2009

(86) PCT No.: PCT/FR2009/051006
§ 371 (c)(1),
(2), (4) Date: Apr. 11, 2011

(87) PCT Pub. No.: WO2009/156654
PCT Pub. Date: Dec. 30, 2009

(65) Prior Publication Data
US 2011/0175441 A1    Jul. 21, 2011

(30) Foreign Application Priority Data
May 29, 2008 (FR) .................................. 08 53511

(51) Int. Cl.
*B60L 1/00* (2006.01)
*B60L 3/00* (2006.01)
*H02G 3/00* (2006.01)
*H01H 83/00* (2006.01)

(52) U.S. Cl.
USPC .............................. 307/9.1; 307/109; 307/116

(58) Field of Classification Search
None
See application file for complete search history.

(56) References Cited

U.S. PATENT DOCUMENTS

| | | | |
|---|---|---|---|
| 5,627,459 A | 5/1997 | Itoyama et al. | |
| 5,982,156 A | 11/1999 | Weimer et al. | |
| 7,372,319 B1 * | 5/2008 | Lee | 327/536 |
| 2003/0086281 A1 | 5/2003 | Dahler et al. | |
| 2008/0130337 A1 * | 6/2008 | Takahashi | 363/126 |
| 2008/0174177 A1 * | 7/2008 | Langlois et al. | 307/9.1 |
| 2008/0310195 A1 * | 12/2008 | Seberger et al. | 363/26 |

FOREIGN PATENT DOCUMENTS

| | | |
|---|---|---|
| AT | 413 914 | 7/2006 |
| EP | 1 298 781 | 4/2003 |

OTHER PUBLICATIONS

International Search Report issued Apr. 20, 2010 in PCT/EP09/051006 filed May 28, 2009.
U.S. Appl. No. 13/379,821, filed Dec. 21, 2011, Prisse, et al.

* cited by examiner

*Primary Examiner* — Jared Fureman
*Assistant Examiner* — Aqeel Bukhari
(74) *Attorney, Agent, or Firm* — Oblon, Spivak, McClelland, Maier & Neustadt, L.L.P.

(57) ABSTRACT

A device and method for coupling two parts of a dc network, in which at least two capacitors respectively are installed, particularly onboard an aircraft. The device includes at least one static converter including at least one electronic coupling device, including at least one transistor and one diode, associated with an inductance, arranged between these at least two capacitors.

10 Claims, 6 Drawing Sheets

DEVICE AND METHOD FOR COUPLING TWO PARTS OF A DC NETWORK, PARTICULARLY IN AN AIRCRAFT

TECHNICAL FIELD

The invention relates to a device and method for coupling two parts of a dc network, particularly in an aircraft.

The following description is made using the example of a high voltage onboard dc network in an aircraft, for simplification reasons.

STATE OF PRIOR ART

High Voltage Direct Current (HVDC) networks are more and more frequently used on future aircraft under development.

Capacitors are installed at various locations in the network, to give good network voltage quality (filtering, stability). The capacitances involved thus form distributed energy reserves.

Operation of aircraft leads to more or less frequent reconfigurations of the direct current network. Different parts are then automatically coupled or decoupled while the aircraft is in use.

FIGS. 1A et 1B shows coupling by means of a coupling device 12, two parts 10 and 11 of a dc network (dc buses) on which there are capacitors C1 and C2. A distinction is made between a network with a single voltage (FIG. 1A) and a network with differential voltages with a mid-point (FIG. 1B), but the principle remains the same.

Capacitors in an onboard dc network are thus present in all parts of this network. When different parts of the network are at different potentials (or voltages), it is preferable to take some precautions before connecting them together, because putting capacitors charged at different potentials in parallel causes strong overcurrents.

Coupling devices traditionally used are electromagnetic contactors. These contactors make on-off coupling, with the most robust part of the network violently applying its voltage to the weaker part. This technical problem remains exactly the same with an electronic coupling device (for example a thyristor).

Fast variations of electrical potentials generate fast variations of capacitor charges, and thus strong current peaks in the capacitors. Naturally, such overcurrents have an effect on coupling elements and on the equipment surrounding the capacitors. Excessive overcurrents can cause malfunctions and even some hardware damage.

The purpose of the invention is to reduce overcurrents that occur during such coupling operations by disclosing a device and method of coupling to connect two parts of a dc network together smoothly with no risks of hardware damage, by limiting the current intensity.

PRESENTATION OF THE INVENTION

The invention relates to a coupling device between a first part and a second part of a high voltage onboard dc network, at least two capacitors being installed at various locations on this network to maintain good voltage quality of the network, first and second capacitors being present in these first and second parts respectively, characterised in that it comprises at least one static step-down voltage converter formed by at least one electronic power coupling device, comprising at least one transistor and one diode associated with an inductance, arranged between these first and second capacitors.

In one advantageous embodiment, the network is a high voltage network. The coupling device is an electronic power coupling device comprising at least one IGBT, MOSFET or bipolar type transistor and a diode. The control device comprises at least one transistor in series with a diode.

Advantageously, the control device comprises a first transistor in series with a first diode and a second transistor in series with a second diode, the first transistor and the second diode being connected to be anti-parallel, and the second transistor and the first diode being connected to be anti-parallel.

The invention also relates to a method for coupling a first and a second part of a high voltage onboard dc network together, at least two capacitors being installed at various locations on this network to maintain good quality of the network voltage, first and second capacitors being present in these first and second parts respectively, characterised in that it comprises the following steps:

at least one of these first and second capacitors is progressively precharged using a static step-down voltage converter located between these first and second capacitors, this converter being formed by at least one electronic power coupling device, comprising at least one transistor and a diode, associated with an inductance and controlled by a control signal, to gradually increase the voltage at the terminals of this at least one capacitor, switchings of this converter are stopped when this at least one capacitor is charged by allowing the transistor to remain continuously in the conducting state.

Advantageously, said at least one capacitor is precharged by a slow charge of at least one capacitor in at least one of the two parts of the network. A load (for example a user terminal) or a set of loads connected to one of the two parts of the network can also be charged slowly, when they are switched on.

Advantageously, protection against overcurrents is provided by protecting electrical conductors and/or limiting the current absorbed by one of the two parts of the network or a user load or terminal.

Advantageously, protection against instabilities is provided by management of any instabilities that occur on the downstream part of the network.

Finally, the invention relates to an aircraft comprising at least one such device.

The device according to the invention has the following advantages:

This device may be placed on a dc network, either on the positive or the negative terminal.

There is no energy dissipation other than intrinsic losses of the device.

Electronic power components in a high voltage dc network can have a long life despite frequent use.

The inductance of the wiring used can be high enough to give good performances, which avoids the need to add an inductance coil, thus saving weight.

The coupling device is compact.

The precharge duration can be adjusted and reconfigured using the control without changing any hardware.

This device may have a protection function against overcurrents and short circuits, by limiting the current to a value defined by the control.

The protection can be adjusted and reconfigured without changing any hardware.

This device can be fully reversible in power, voltage and current.

Several devices can be put in parallel to increase the current rating.

A passive protection element such as a fuse guarantees operating safety of the network, even when the device fails.

This device guards against the risk of instabilities that could occur on the output side.

DETAILED PRESENTATION OF PARTICULAR EMBODIMENTS

The invention relates to a device enabling smooth coupling of two parts 10 and 11 of a dc network, for example a high voltage network, in which there are two capacitors C1 et C2, by progressively (slowly) precharging these two capacitors C1 and C2.

Figure 1A:
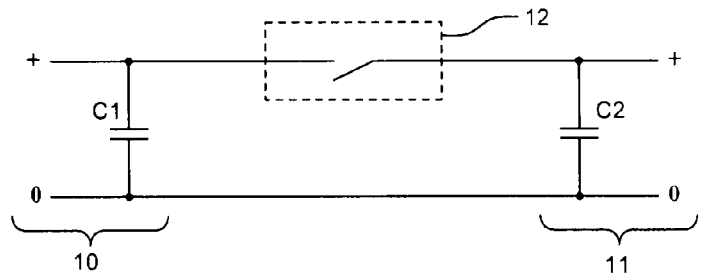
FIGS. 1A and 1B shows coupling of two parts of a dc network, for a simple network and for a network with differential +/− voltages respectively.
Figure 1B:
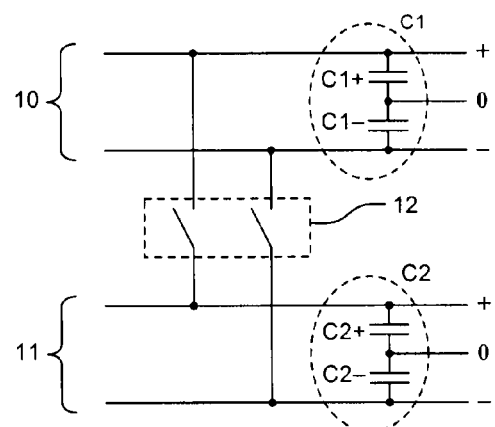
Figure 2A:
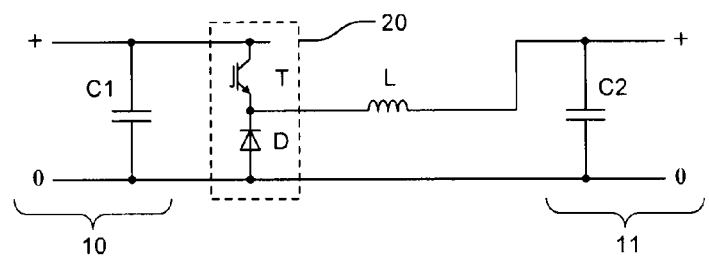
FIGS. 2A and 2B show the device according to the invention, for a simple dc network and for a network with differential +/− voltages respectively.
Figure 2B:
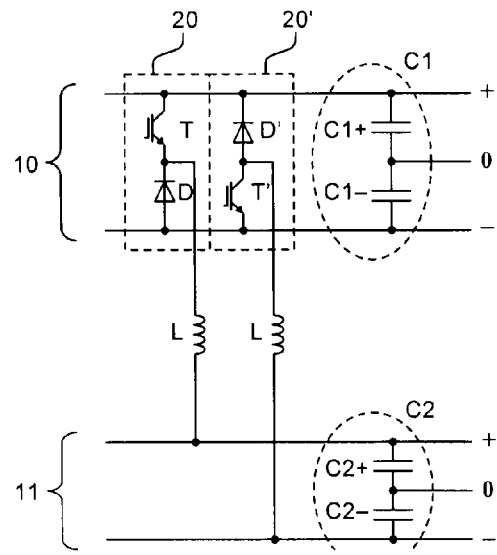

FIGS. 2A and 2B show the principle embodiment of such a device that uses a coupling device 20 with power electronics using transistors (IGBT, MOSFET, bipolar, etc.). IGBT ("Insulated Gate Bipolar Transistor") type transistors will be considered in these figures and therefore in the remainder of the description, as an example.

This coupling device 20, classically composed of a transistor T and a diode D, is associated with an inductance L and forms a static step-down voltage ("buck") converter in the direction from the first part 10 of the network to the second part 11. In these figures, the transistor T is an IGBT transistor connected between the (+) power supply voltage and the 0 voltage in series with a diode D, its collector being connected to the (+) potential and the anode of the diode D being connected to the 0 potential, the inductance L being connected to the connection point of the emitter of transistor T and the cathode of the diode D.

If we assume that the second part 11 is initially switched off, coupling the first part 10 to the second part 11 will require that the capacitor C2 should be precharged. The convertor (electronic coupling device 20 and inductance L) is controlled by a control signal applied to the gate of the IGBT transistor T, in a manner that will be obvious to those skilled in the art (see example embodiment at the end of the description) to progressively increase the voltage at the terminals of the capacitor C2. Once this capacitor is charged, voltages between the two parts 10 and 11 of the network are balanced, switchings of this converter are stopped leaving the transistor T permanently in the conducting state.

This operating principle shown in FIG. 2A is exactly the same for a network with differential voltages like that shown in FIG. 2B. A coupling device is then inserted on each potential: one coupling device 20 on the positive (+) terminal and one coupling device 20' on the negative (−) terminal. Coupling is obtained under optimum conditions using a common (synchronised) control for these two coupling devices 20 and 20' (common control signal on the gates of the two IGBT transistors T and T').

The precharge is done actively, in other words it does not require any passive dissipation elements such as resistors.

The device according to the invention has several advantages:

There is no energy dissipation other than intrinsic losses of the device.

The electronics enables long life despite frequent use.

The inductance of the wiring used can be high enough to give good performances, which avoids the need to add an inductance coil, thus saving weight.

The electronic power coupling device 20 (20') is compact.

This coupling device 20 (20') is controlled so as to adapt the precharge duration as a function of the need.

This coupling device 20 (20') is controlled so that the device according to the invention can be provided with a protection function against overcurrents and short circuits.

These last two advantages are made possible because the convertor control can be used, and the transistor T can be controlled classically so as to fix a precharge time and/or not allow a current higher than a determined value to pass.

Figure 3A:
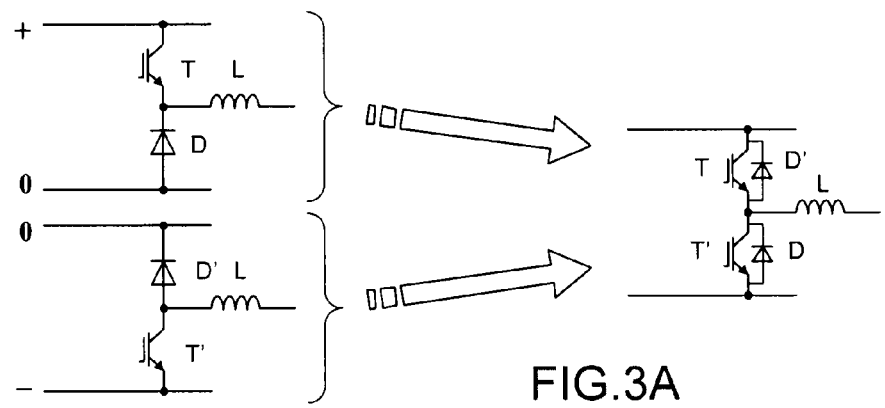
FIGS. 3A, 3B and 3C show standardisation of the coupling converter by precharge of the device according to the invention.

In a first variant embodiment shown in FIG. 3A, the electronic coupling device 30 is used together with a second transistor T' to improve controllability and functions. It is then composed of a complete arm with two transistors T, T' and two diodes D, D' so that the convertor can function as a voltage step-up ("boost") from the second part to the first part. The first transistor T and the first diode D are connected as shown in FIG. 2. The second transistor T' and the second diode D' are connected firstly in series with the first transistor T and the first diode D respectively, and secondly connected to be anti-parallel with the first diode D and the first transistor T respectively.

Figure 3B:
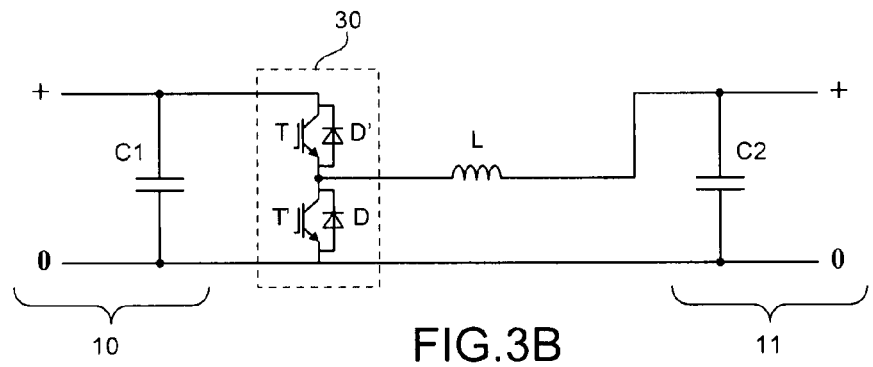
Figure 3C:
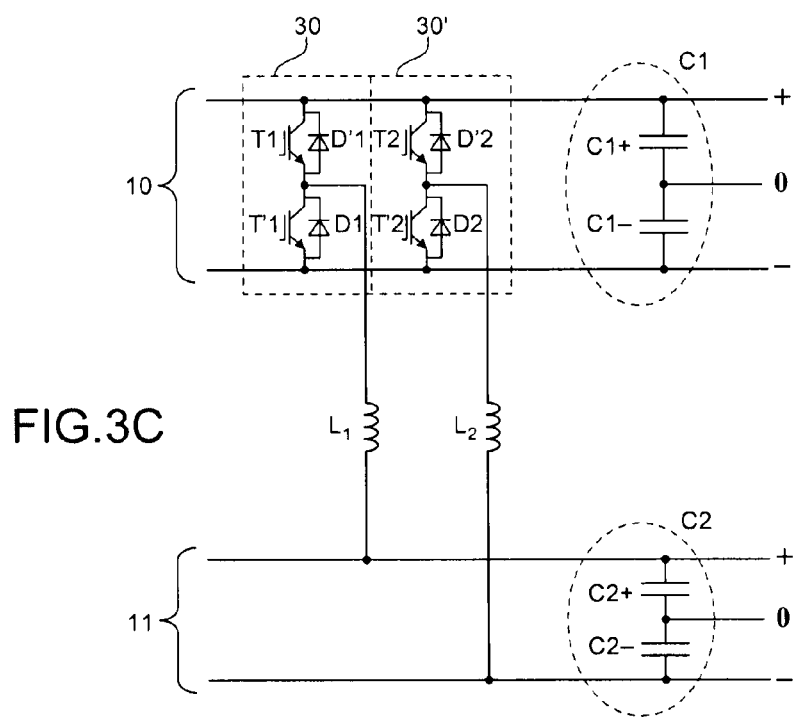

The structure of the convertor is thus standardised so that the same component 30, 30' can be used for the positive (+) and negative (−) terminals as shown in FIGS. 3B and 3C, that correspond to FIGS. 2B and 2C respectively.

There are several advantages in this standardisation of the conversion device:
more features due to the additional degree of control;
wider choice in manufacturer component ranges;
lower costs due to the quantity effect;
smaller number of component references used.

Figure 4:
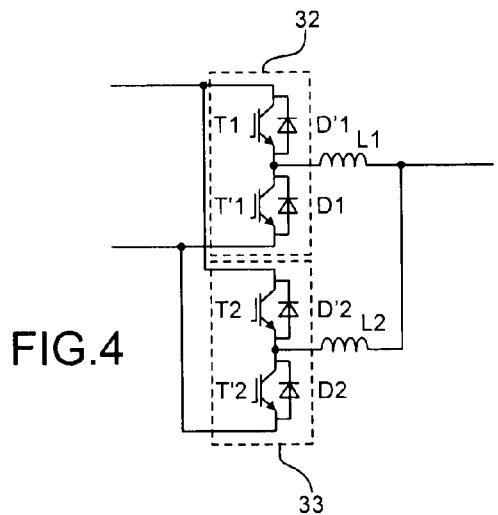
FIG. 4 shows how two devices according to the invention are put in parallel.

In a second variant embodiment shown in FIG. 4, several coupling devices according to the invention 32 and 33 like those shown in FIG. 3A are coupled in parallel so that the current rating of the device according to the invention is multiplied by the number of coupling devices put in parallel. Identical devices with output interconnection inductances L1, L2 are put into parallel to give good performances and to achieve good reliability.

Figure 5:
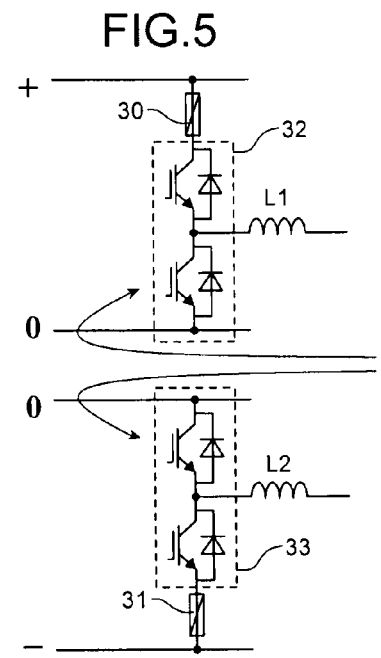
FIG. 5 shows an ultimate protection for dc buses using passive elements such as fuses.

FIG. 5 shows such conversion devices 32 and 33 with an ultimate protection. A passive element such as a fuse 30 or 31 is then placed in series with the positive (+) or negative (−) terminal, and provides protection against possible short circuit of the dc bus in the case of a converter failure.

The device according to the invention as shown in FIGS. 3A, 3B and 3C and in FIG. 5 can only be used to connect the second part 11 to the first part 10. The first part cannot be preloaded by the second part. But power can be transferred from the second part to the first part through diode D' connected in anti-parallel with the transistor T for the positive part and through diode D with transistor T' for the negative part. Therefore, this structure does not enable reversibility of the precharge, but does allow reversibility in power.

Figure 6A:
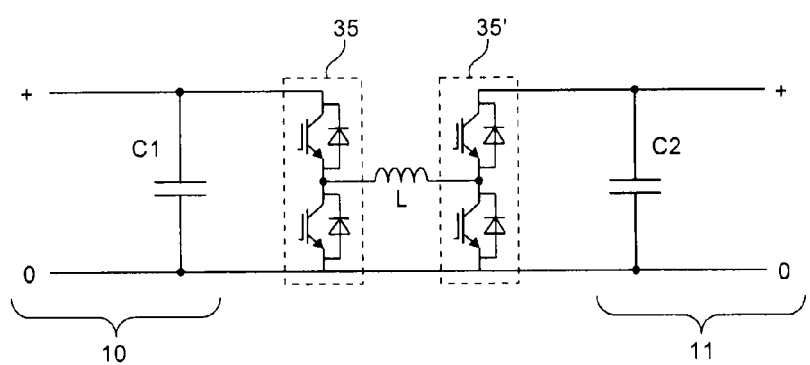
FIGS. 6A, 6B and 6C show example embodiments of the invention allowing reversibility of precharges from the first part to the second part of the network, from the second part to first part of the network, and in either direction indifferently, respectively.
Figure 6B:
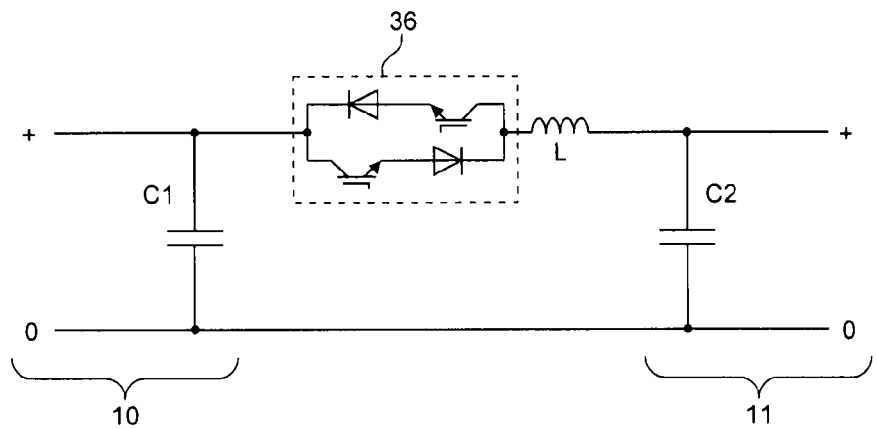
Figure 6C:
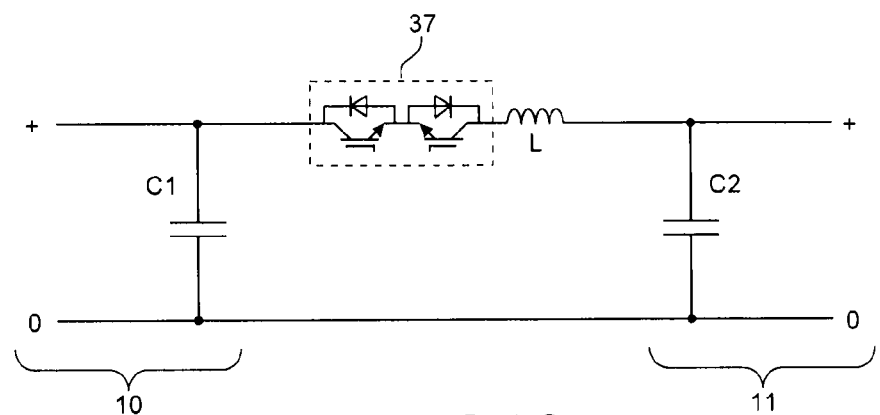

Some electronic structures shown in FIGS. 6A, 6B and 6C, enable complete reversibility to indifferently couple the second part onto the first part and vice versa, the advantages of the invention then remaining valid.

In FIG. 6A, two cells 35 and 35' like those illustrated on FIG. 3A are used, each connected to one of the two parts 10 and 11 of the network and connected to each other at their mid-point through the inductance L.

In FIG. 6B, the two parts 10 and 11 are connected to each other through a coupling device 36 comprising a first transistor and a first diode in series connected to be anti-parallel with a second transistor and a second diode in series, and an inductance L.

In FIG. 6C, the two parts 10 and 11 are connected to each other through a coupling device 37 comprising a first transistor to which a first diode is connected to be anti-parallel, and a second transistor to which a second diode is connected to be anti-parallel; the two transistors being connected in series but in opposite directions, and an inductance L.

Control of this conversion device can avoid instabilities on the dc network on the output side of the device (second part). Therefore the device according to the invention can perform three functions:

Precharge, by slowly charging the capacitors of part of the network or a load (for example a user terminal), or a set of loads that can be connected to one of the two parts of the network when they are powered up.

Protection against overcurrents: by the protection of electrical conductors (electronic circuit breaker function) and/or limitation of the current absorbed by part of the network or a load (for example a user terminal) or a set of loads that can be connected to one of the two parts of the network.

Protection against instabilities: by management of any instabilities that arise on the part of the network output side of the device (second part). The distribution of a dc electrical network raises risks of instabilities. The voltage can oscillate and reach excessive values causing hardware damage. Power transfers are controlled due to management of the voltage and current on the second part of the network (or a load or a set of loads), and these instabilities can be eliminated.

The device according to the invention can thus control the voltage of the second part of the network or a load (user) or a set of loads, during the precharge of the capacitor(s) in this same part of the network or load (user) or set of loads. The device according to the invention can also control the line current in the second part of the network or in a load (user) or in a set of loads, while the capacitors are being precharged, and when overcurrents generated by this same part of the network or load (user) or set of loads occur.

As described above, in the case of a high voltage dc network, the device according to the invention is essentially composed of electronic power components, plus miniature control electronics. If the control electronics are digital and programmable, the entire device according to the invention then forms a generic whole and is programmable and reconfigurable to suit needs. An adapted control can then be installed to control the part of the network concerned.

Some precautions should then be taken when setting control parameters. Several parameters of the device according to the invention can thus be adjusted to control the user voltage and current:

the value of the current to be limited (Imax);
the ripple current ($\Delta I$) that can be defined as hysteresis;
the maximum time ($\Delta t_{max}$) during which it is desired to limit the current;
the maximum switching frequency ($f_{max}$).

The maximum operating frequency $f_{max}$ and the maximum operating time $\Delta t_{max}$ of the device according to the invention must be compatible with the temperature performances of the device to prevent temperature rise and premature aging of the device.

Figure 7:
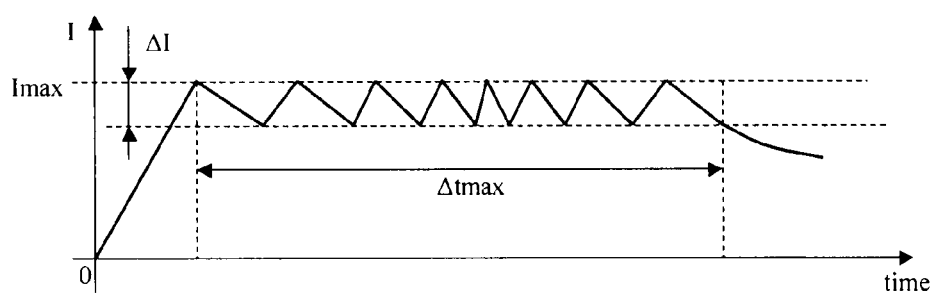
FIGS. 7, 8 and 9 show operating strategies according to the invention, showing a constant ripple current ($\Delta I$) strategy, a constant frequency ($f_{max}$) strategy and a priority ripple current ($\Delta I$) but limited frequency ($f_{max}$) strategy respectively.

There are several possible operating strategies, and particularly the following three strategies that vary the above-mentioned parameters:

A constant ripple current $\Delta I$ strategy shown in FIG. 7; when the line current I reaches the maximum allowable value $I_{max}$, the limitation of this current acts to maintain a constant ripple current within a given range $\Delta I$. In this case, the switching frequency of the device according to the invention varies as a function of network parameters.

Figure 8:
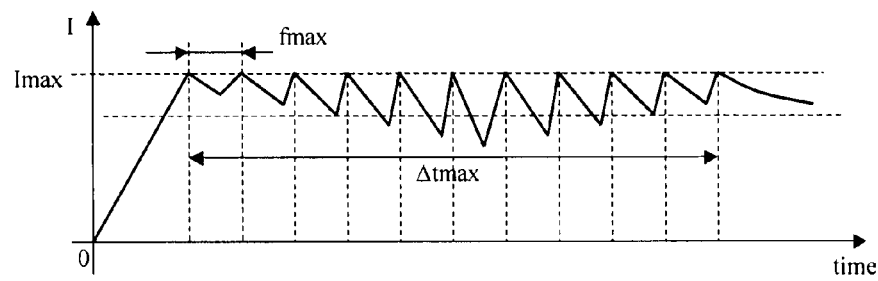

A constant frequency $f_{max}$ strategy shown in FIG. 8: when the line current I reaches the maximum allowable value $I_{max}$, the limitation of this current acts so as to keep the switching frequency constant and equal to the maximum reasonable value $f_{max}$. In this case, the ripple current $\Delta I$ varies as a function of network parameters.

Figure 9:
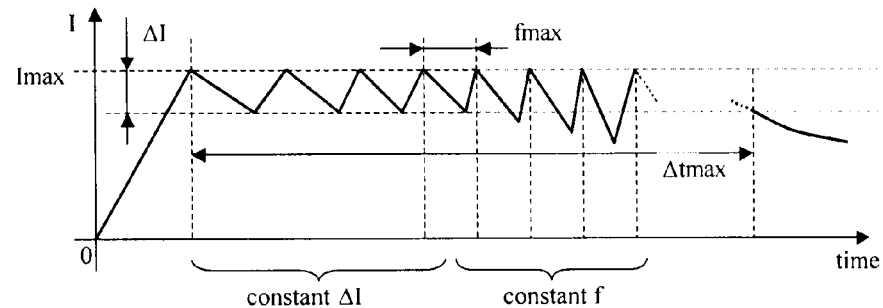

A priority ripple current $\Delta I$ strategy but with a limited frequency $f_{max}$ shown in FIG. 9: when the line current I reaches the maximum allowable value $I_{max}$, the limitation of this current acts so as to maintain a constant ripple current within a given range $\Delta I$. As in the first strategy shown in FIG. 7, the switching frequency of the device varies as a function of network parameters, but it is limited to its maximum allowable value $f_{max}$. When the frequency is limited, the ripple current $\Delta I$ varies as a function of network parameters.

The final strategy illustrated on FIG. 9 makes a good compromise. It makes it possible to respect the switching frequency so as to limit temperature rises of the device.

Furthermore, the temperature rise of the device is also related to the operating duration of the device in active mode ($\Delta t_{max}$). This is why this duration is monitored. Thus, a fault is declared if the current has not returned to a nominal operating range within a determined time $\Delta t_{max}$, and the device is opened.

Example Embodiment

Figure 10:
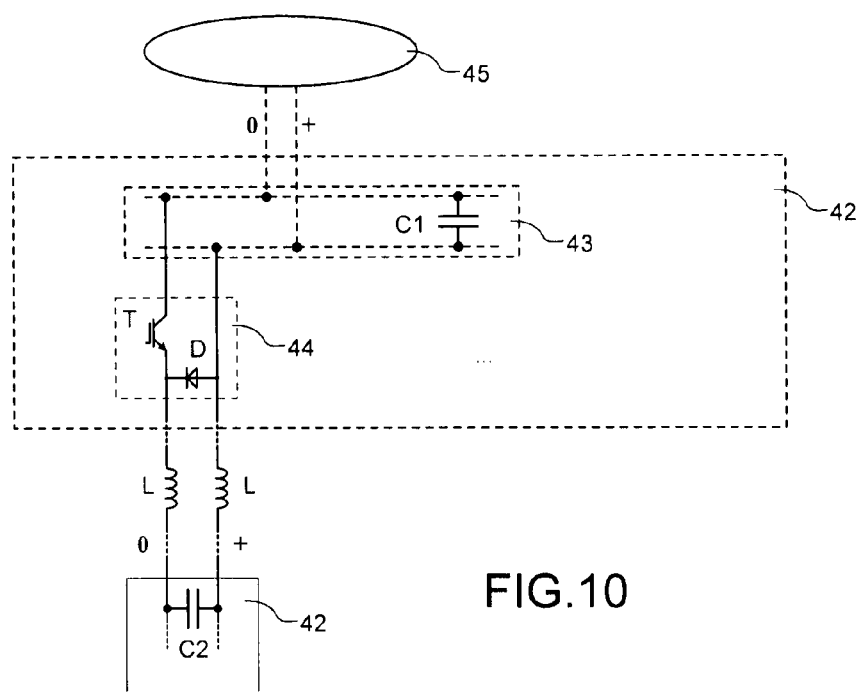
FIG. 10 shows an example embodiment in which a user terminal is connected to an electrical core.

In one example embodiment shown in FIG. 10, a busbar 43 is powered by an HVDC (high voltage DC) generation system 45. The electronic coupling device 44 (electronic power arm) is placed near the busbar 43 in an electrical core 42. The user terminal 40 is located several meters from the electrical core 41. The inductance L of the cables is then sufficient to act as the convertor switching inductance. A first capacitor C1 with a high value is present on the bus 43, in the electrical core 42. A second capacitor C2 is located at the input to the user terminal 40.

Figure 11A:
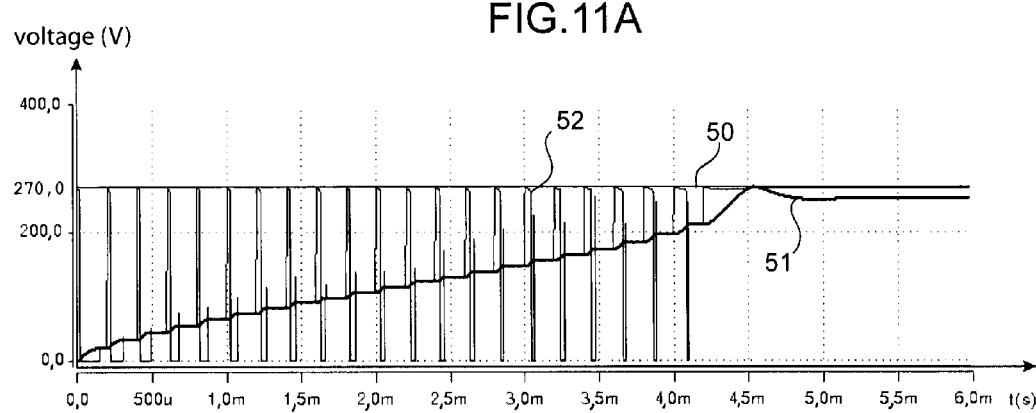
FIGS. 11A and 11B show voltage and current shapes during charging of the capacitor of a user terminal in this example embodiment.
Figure 11B:
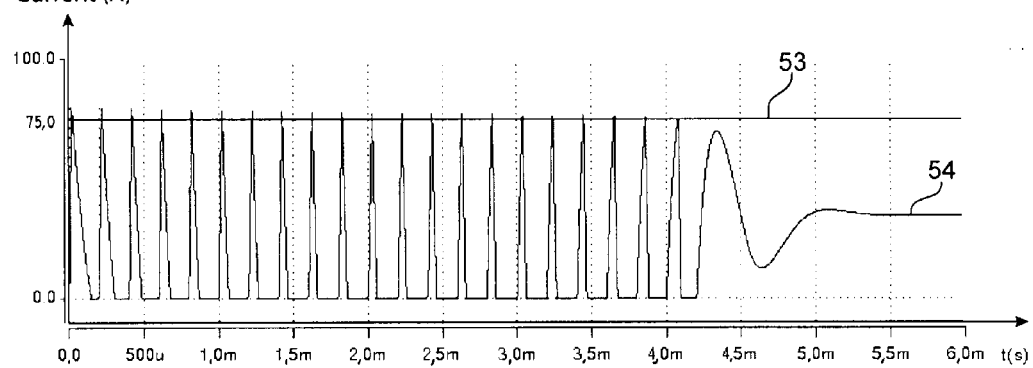

FIG. 11A shows the voltage curves for the bus 50, the user 51 and the coupling device 52. FIG. 11B shows the limiting current curve 53 and the user current curve 54.

Thus as shown in these figures, coupling of the user terminal 40 to the network (HVDC busbar 43) is ordered at time t=0. The coupling device 44 comes into action. The transistor T becomes conducting, increasing the current 54 circulating at the input to the user terminal. The voltage 51 at the terminals of the user terminal also increases by the charge of its internal capacitor C2. When the user current 54 reaches the predefined limiting value 53 (for example 75 A), the transistor T is blocked. The user current 54 decreases while the user voltage 51 is held constant by the capacitor C2. After a certain time that assures that a given switching frequency (for example 5 kHz) is not exceeded, the transistor T becomes conducting again, once again increasing the charge of the capacitor C2. The phenomenon is repeated until the capacitor C2 is almost completely charged, reaching almost 100% of the network voltage (for example 270 V).

The user terminal can start operation once this precharging phase of the user capacitor C2 is complete.

The strategy in this case is the priority ripple current (ΔI) strategy with limited frequency ($f_{max}$) shown in FIG. 9. But in this application, the low inductances L between the two parts of the network impose a permanent operating mode in frequency limitation. This is not a problem and it enables good performances.

As shown in FIGS. 11A and 11B, the precharging time is very short, less than 5 ms. This is much less than the time taken by a simple electromechanical contactor to close.

In this example embodiment, the first function of the device according to the invention is performed; the line current does not exceed the predefined maximum value, and the precharge of the user capacitor C2 is performed correctly.

The invention claimed is:

1. A high voltage direct current network onboard an aircraft, comprising:
    at least one electric power coupling device between a first part and a second part of the network,
    at least first and second capacitors, forming distributed energy reserves, being installed at the first and the second part of the network respectively to maintain voltage quality of the network, and
    means for controlling the at least one coupling device to precharge the at least first and second capacitors,
    wherein the at least one coupling device forms at least one static step-down voltage converter comprising at least one transistor and one diode associated with an inductance, arranged between the at least first and second capacitors.

2. The network according to claim 1, wherein the electronic power coupling device includes at least one IGBT, MOSFET, or bipolar type transistor, and a diode.

3. The network according to claim 2, wherein the means for controlling is a control device that comprises at least one transistor in series with a diode.

4. The network according to claim 3, wherein the control device comprises a first transistor in series with a first diode, and a second transistor in series with a second diode, the first transistor and the second diode being connected to be anti-parallel, and the second transistor and the first diode being connected to be anti-parallel.

5. A method for coupling a first and a second part of a high voltage direct current network onboard an aircraft comprising at least one electric power coupling device between a first part and a second part of the network, at least first and second capacitors, forming distributed energy reserves, being installed at locations on said first and second parts of the network respectively to maintain voltage quality of a network voltage, the method comprising:
    at least one of the first and second capacitors being progressively precharged using the at least one electronic power coupling device forming a static step-down voltage converter located between the first and second capacitors, comprising at least one transistor and one diode, associated with an inductance and controlled by a control signal, to gradually increase the voltage at the terminals of the at least one first and second capacitors; and
    switchings of the at least one electronic power coupling device being stopped when the at least one of the first and second capacitors is charged by allowing the transistor to remain continuously in a conducting state.

6. A method according to claim 5, wherein the at least first and second capacitors is precharged by a charge of at least one capacitor in at least one of the two parts of the network.

7. A method according to claim 5, wherein the at least first and second capacitors is precharged by a charge of at least one capacitor of a load or set of loads, that can be connected to one of the two parts of the network, when they are switched on.

8. A method according to claim 5, wherein protection against overcurrents is provided by protecting electrical conductors or limiting the current absorbed by one of the two parts of the network or a user load or terminal.

9. A method according to claim 5, wherein protection against instabilities is provided by management of any instabilities that occur on a downstream part of the network.

10. An aircraft comprising:
    a high voltage direct current network onboard an aircraft, including
        at least one electric power coupling device between a first part and a second part of the network,
        at least first and second capacitors, forming distributed energy reserves, being installed at the first and the second part of the network respectively to maintain voltage quality of the network, and
        means for controlling the at least one coupling device capable of precharging the at least first and second capacitors,
    wherein the at least one coupling device forms at least one static step-down voltage converter comprising at least one transistor and one diode associated with an inductance, arranged between the at least first and second capacitors.

* * * * *